US006275991B1

(12) United States Patent
Erlin

(10) Patent No.: US 6,275,991 B1
(45) **Date of Patent: *Aug. 14, 2001**

(54) IR TRANSMITTER WITH INTEGRAL MAGNETIC-STRIPE ATM TYPE CREDIT CARD READER AND METHOD THEREFOR

(75) Inventor: Dan Erlin, Redwood City, CA (US)

(73) Assignee: FCA Corporation, San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,310

(22) Filed: Aug. 26, 1999

Related U.S. Application Data

(63) Continuation of application No. 08/666,027, filed on Jun. 19, 1996, now Pat. No. 5,973,756, which is a continuation-in-part of application No. 08/597,246, filed on Feb. 6, 1996, now Pat. No. 5,870,155.

(51) Int. Cl.[7] .......... H04N 7/173

(52) U.S. Cl. .......... 725/141; 725/133; 725/6; 348/734

(58) Field of Search .......... 345/327; 348/734, 348/2, 13, 12, 176, 10, 211; 455/5.1, 4.2, 7, 6.2, 6.3; 725/141, 133, 6; H04N 7/16, 7/173

(56) References Cited

U.S. PATENT DOCUMENTS

| | | | |
|---|---|---|---|
| Re. 32,115 | 4/1986 | Lockwood et al. | 235/381 |
| D. 298,325 | 11/1988 | Isozaki | D14/105 |
| D. 312,628 | 12/1990 | Yokoi | D14/100 |
| D. 342,070 | 12/1993 | Takama | D14/218 |
| D. 363,486 | 10/1995 | Shinohara | D14/218 |
| D. 363,720 | 10/1995 | Lagohm | D14/218 |
| D. 364,391 | 11/1995 | Drugge | D14/100 |
| 3,956,615 | 5/1976 | Anderson, et al. | 235/617 |
| 4,114,099 | 9/1978 | Hollander | 325/392 |
| 4,231,031 | 10/1980 | Crowther et al. | 340/695 |
| 4,567,512 | 1/1986 | Abraham | 358/86 |
| 4,897,718 | 1/1990 | Testin et al. | 358/194.1 |
| 5,321,243 | 6/1994 | Groves | 235/449 |
| 5,325,423 | 6/1994 | Lewis | 379/90 |
| 5,334,824 | 8/1994 | Martinez | 235/380 |
| 5,336,870 | 8/1994 | Hughes et al. | 235/379 |
| 5,386,106 | 1/1995 | Kumar | 235/462 |
| 5,410,326 | 4/1995 | Goldstein | 348/134 |
| 5,420,573 | 5/1995 | Tanaka et al. | 340/825.24 |
| 5,475,585 | 12/1995 | Bush . | |
| 5,488,411 | 1/1996 | Lewis | 358/8 |
| 5,585,866 | 12/1996 | Miller et al. | 348/906 |
| 5,594,493 | 1/1997 | Nemirofsky | 348/13 |
| 5,603,078 * | 2/1997 | Henderson et al. | 455/5.1 |
| 5,650,831 | 7/1997 | Farwell | 348/734 |
| 5,661,517 * | 8/1997 | Budow et al. | 348/13 |
| 5,715,020 | 2/1998 | Kuroiwa et al. | 348/734 |
| 5,870,155 * | 2/1999 | Erlin | 348/734 |
| 5,999,624 | 12/1999 | Hopkins . | |

FOREIGN PATENT DOCUMENTS

| | | | |
|---|---|---|---|
| 362192069A | 8/1987 | (JP) | G11B/19/02 |
| 63240190 | 10/1988 | (JP) . | |
| WO9517796 | 6/1995 | (WO) . | |

OTHER PUBLICATIONS

Audio Video International Jan. 1994 p. 35 Pioneer Remote Control.

Video Magazine Sep. 1994 p. 40 Crystal One Remote Control.

Video Magazine Sep. 1994 p. 51 Geminis Smart 15.

* cited by examiner

*Primary Examiner*—Chris Grant
(74) *Attorney, Agent, or Firm*—Trial & Technology Law Group

(57) ABSTRACT

A television remote control unit including an IR (infra-red) transmitter with integral magnetic stripe ATM type credit card reader and method therefor for transmitting IR signals to a remote interactive location such as a television set or a TV cable remote control box. The remote control unit permits the user to swipe a credit card through the credit card reader so as to generate credit card transaction signals for transmission to the remote interactive locations. The remote control unit can be used in an interactive environment such as a hotel casino, a cable TV home shopping network, or an off track betting (OTB) environment.

8 Claims, 15 Drawing Sheets

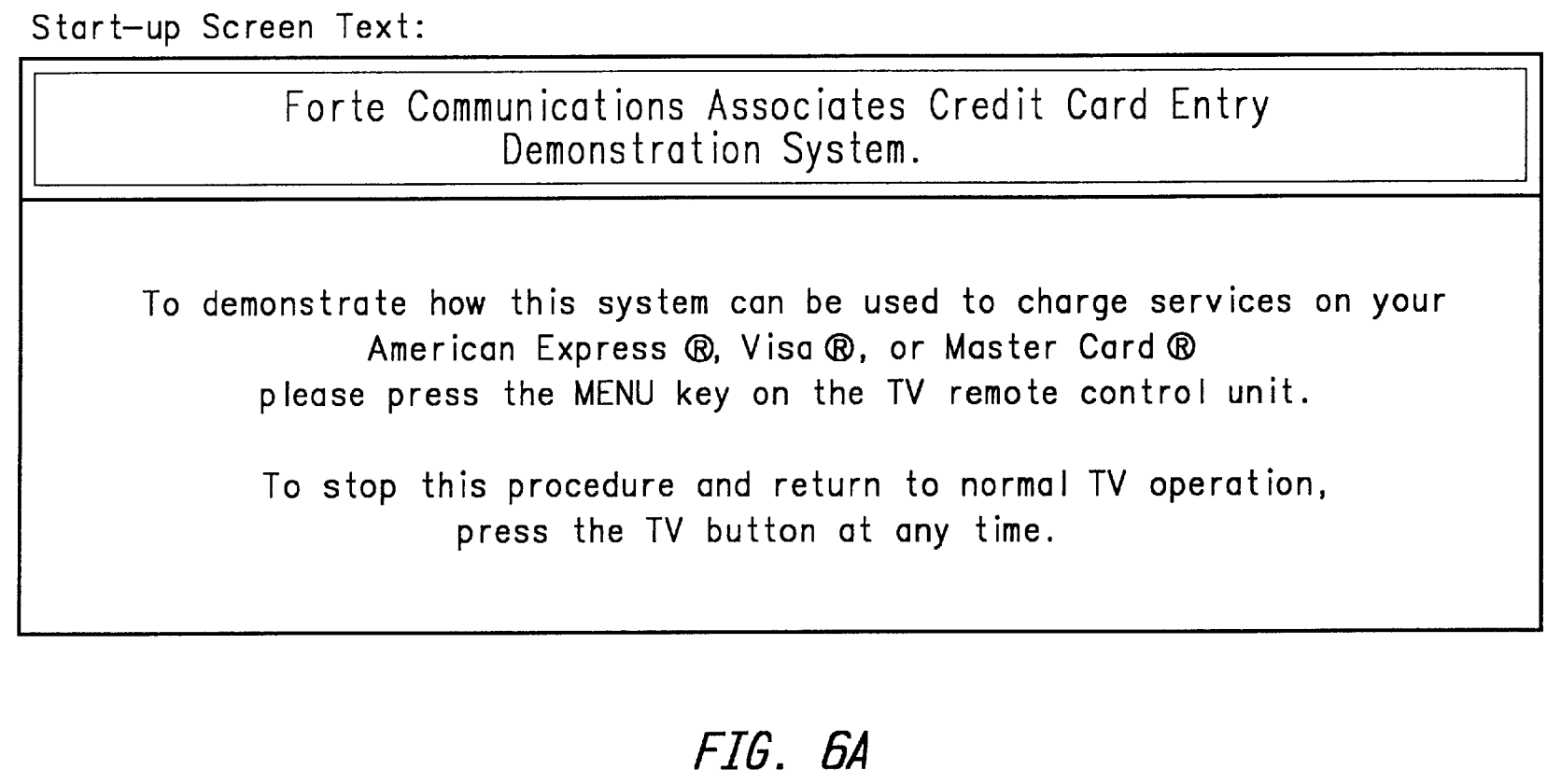

Start-up Screen Text:

Forte Communications Associates Credit Card Entry Demonstration System.

To demonstrate how this system can be used to charge services on your American Express ®, Visa ®, or Master Card ® please press the MENU key on the TV remote control unit.

To stop this procedure and return to normal TV operation, press the TV button at any time.

FIG. 6A

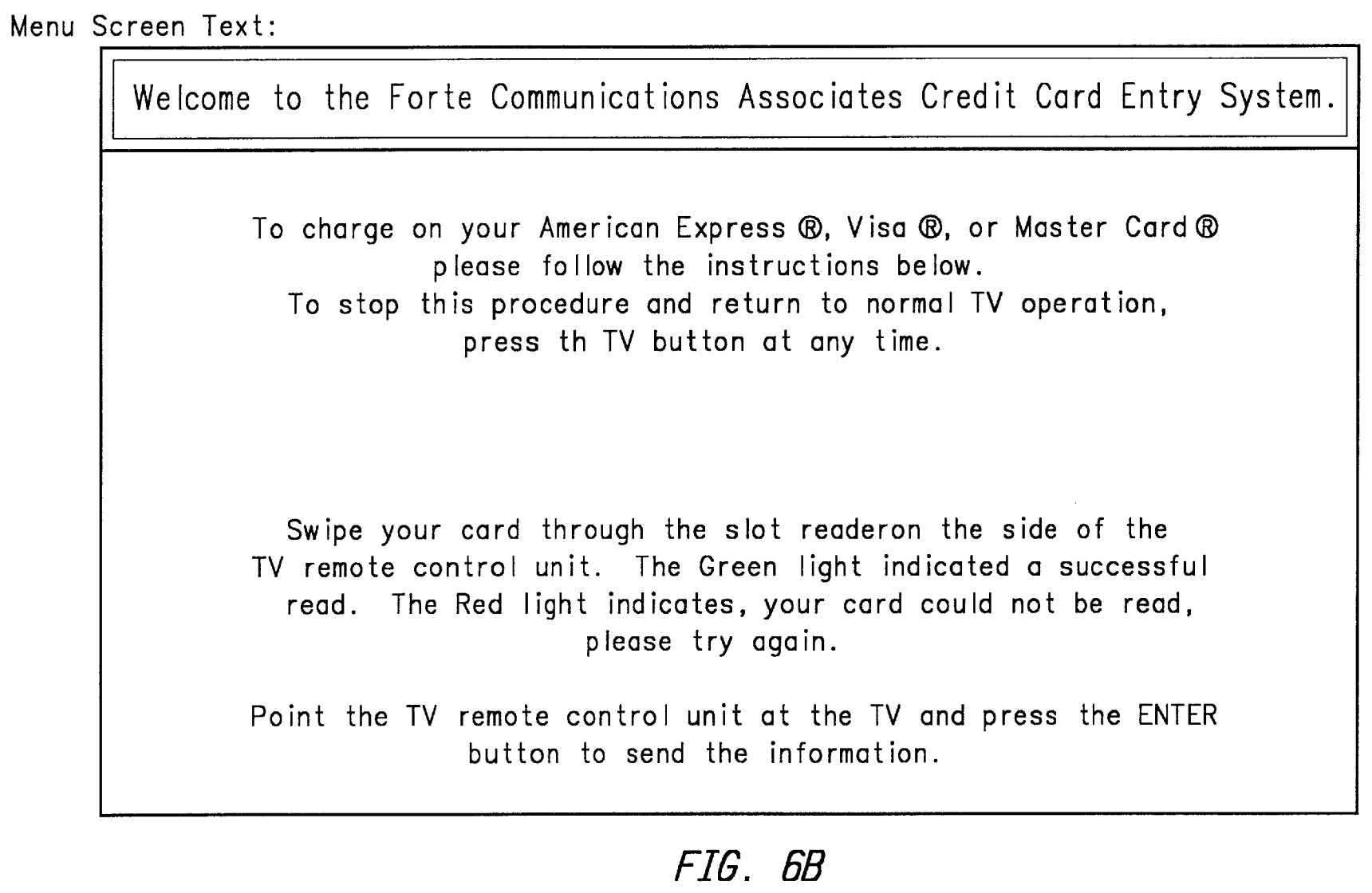

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press th TV button at any time.

Swipe your card through the slot readeron the side of the
TV remote control unit. The Green light indicated a successful
read. The Red light indicates, your card could not be read,
please try again.

Point the TV remote control unit at the TV and press the ENTER
button to send the information.

FIG. 6B

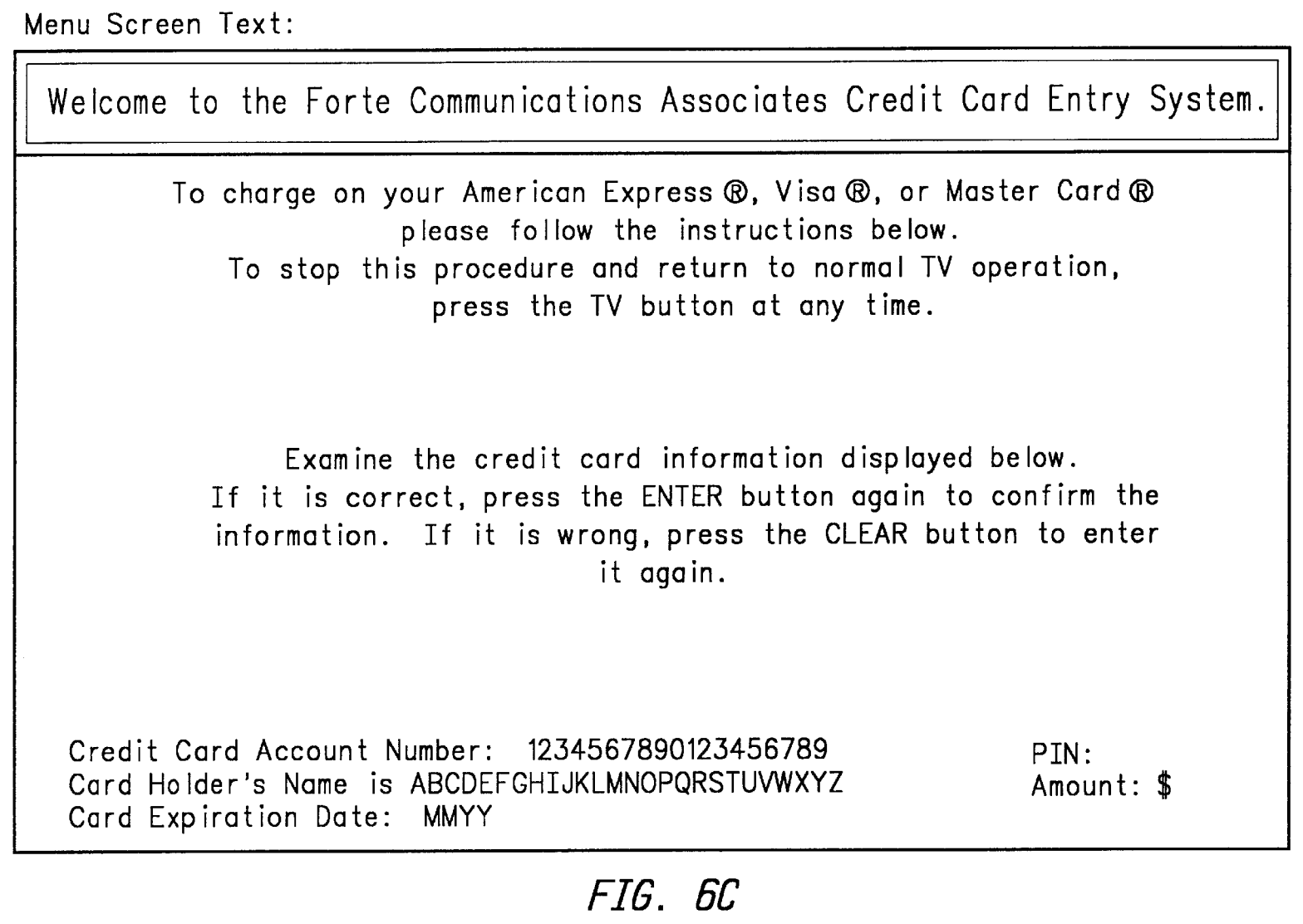

Menu Screen Text:

Welcome to the Forte Communications Associates Credit Card Entry System.

To charge on your American Express®, Visa®, or Master Card®
please follow the instructions below.
To stop this procedure and return to normal TV operation,
press the TV button at any time.

Examine the credit card information displayed below.
If it is correct, press the ENTER button again to confirm the
information. If it is wrong, press the CLEAR button to enter
it again.

Credit Card Account Number: 1234567890123456789
Card Holder's Name is ABCDEFGHIJKLMNOPQRSTUVWXYZ
Card Expiration Date: MMYY PIN:
Amount: $

FIG. 6C

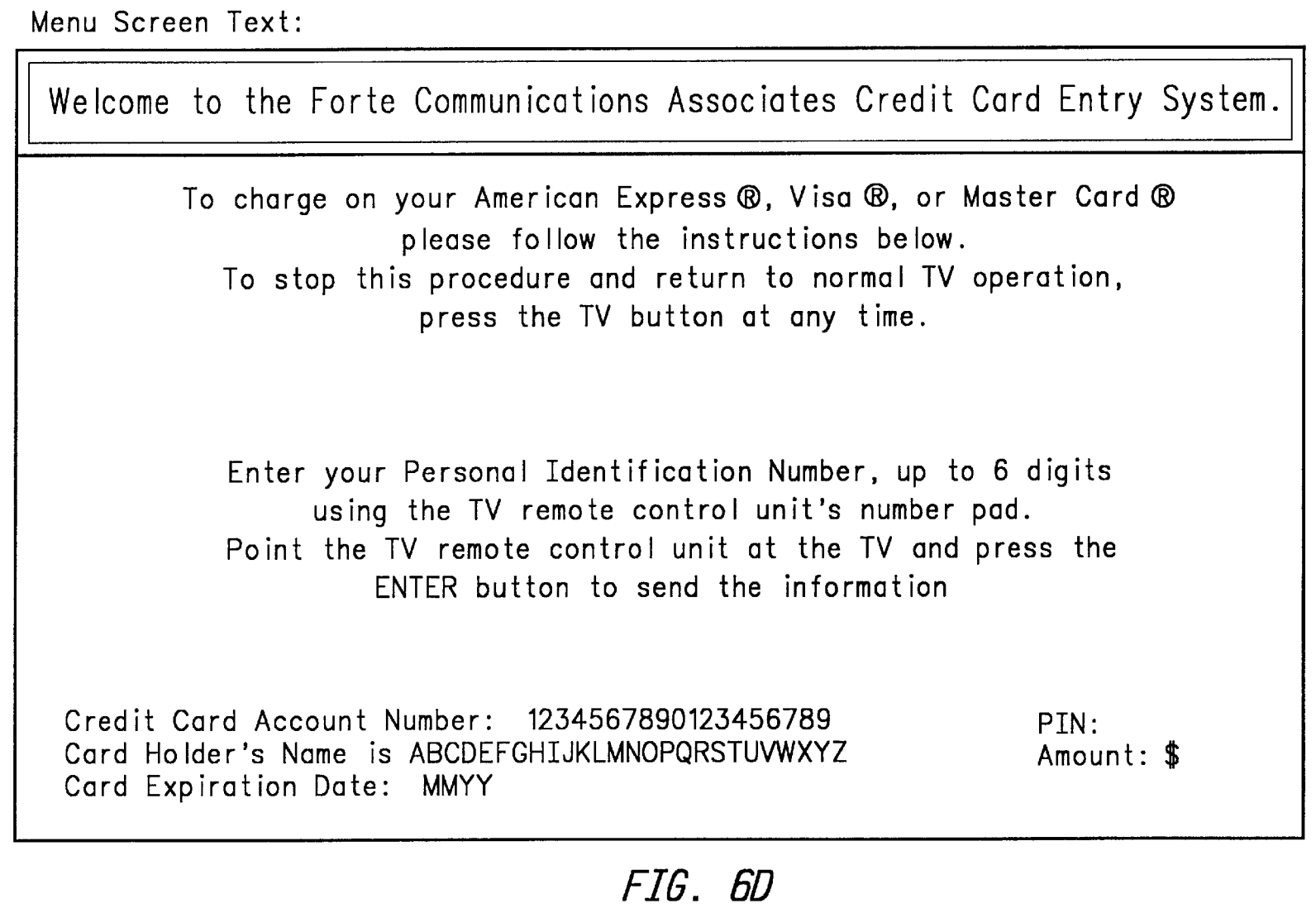

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press the TV button at any time.

Enter your Personal Identification Number, up to 6 digits
using the TV remote control unit's number pad.
Point the TV remote control unit at the TV and press the
ENTER button to send the information Credit Card Account Number: 1234567890123456789
Card Holder's Name is ABCDEFGHIJKLMNOPQRSTUVWXYZ
Card Expiration Date: MMYY PIN:
Amount: $

FIG. 6D

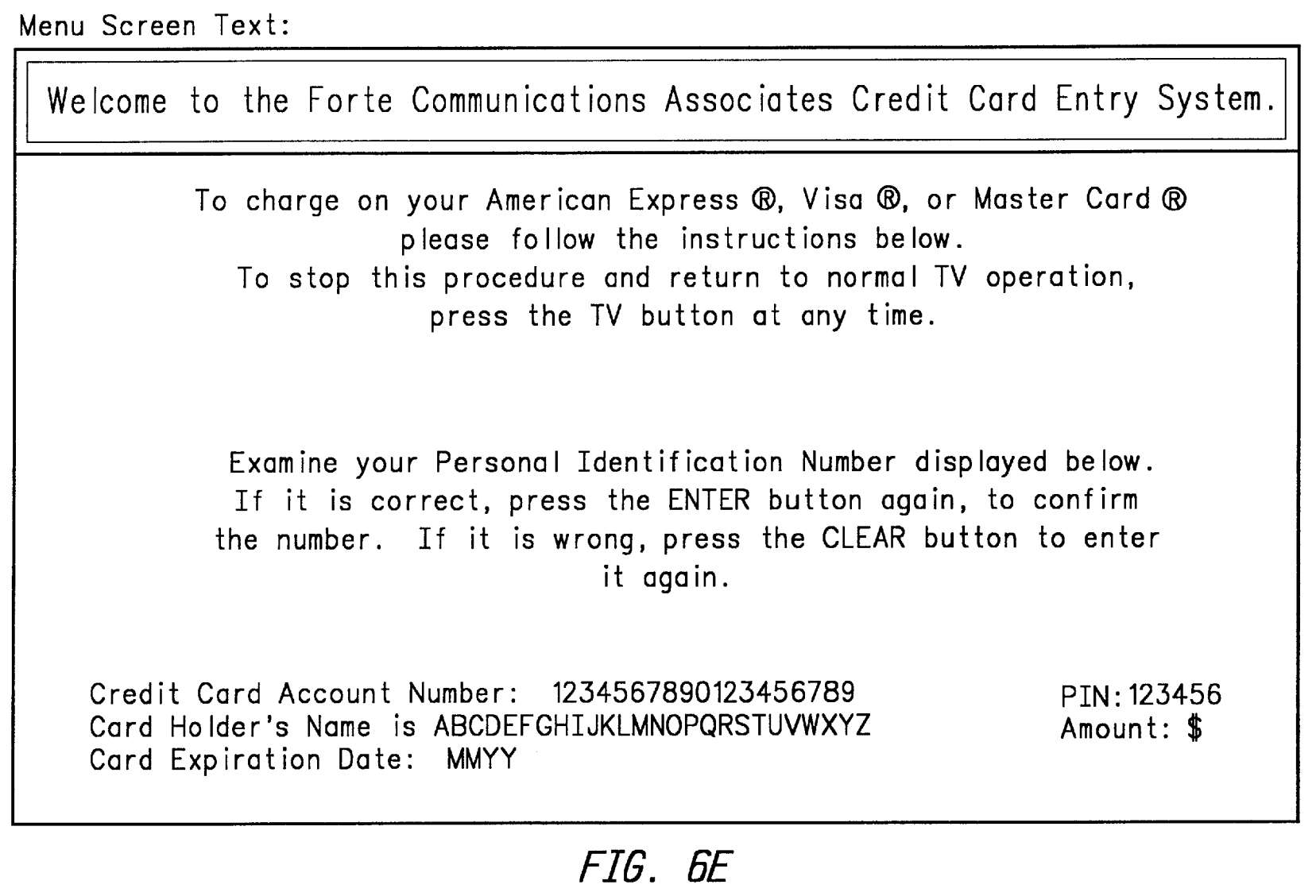

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press the TV button at any time.

Examine your Personal Identification Number displayed below.
If it is correct, press the ENTER button again, to confirm
the number. If it is wrong, press the CLEAR button to enter
it again.

Credit Card Account Number: 1234567890123456789
Card Holder's Name is ABCDEFGHIJKLMNOPQRSTUVWXYZ
Card Expiration Date: MMYY PIN: 123456
Amount: $

FIG. 6E

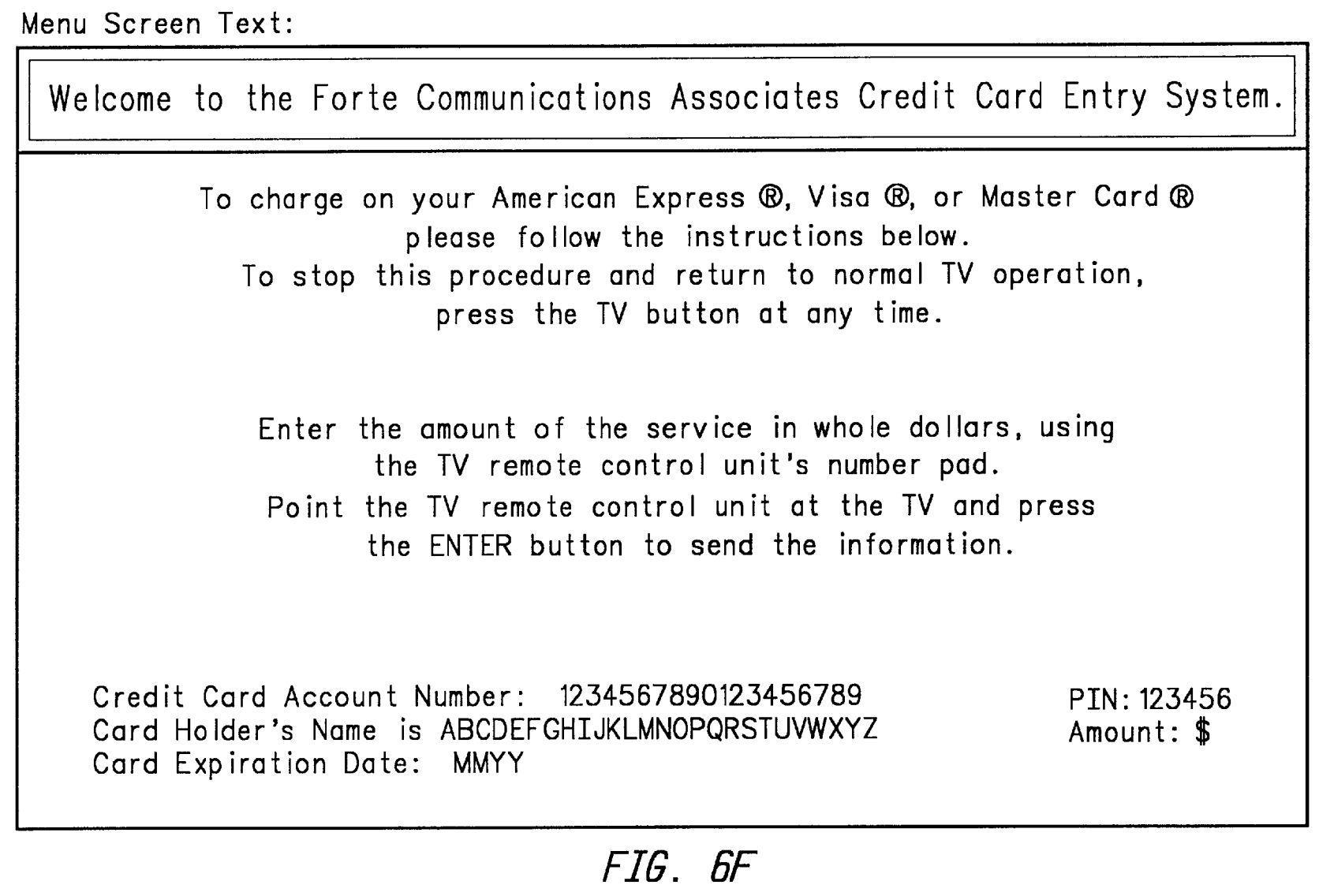

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press the TV button at any time.

Enter the amount of the service in whole dollars, using
the TV remote control unit's number pad.
Point the TV remote control unit at the TV and press
the ENTER button to send the information.

Credit Card Account Number: 1234567890123456789
Card Holder's Name is ABCDEFGHIJKLMNOPQRSTUVWXYZ
Card Expiration Date: MMYY PIN: 123456
Amount: $

FIG. 6F

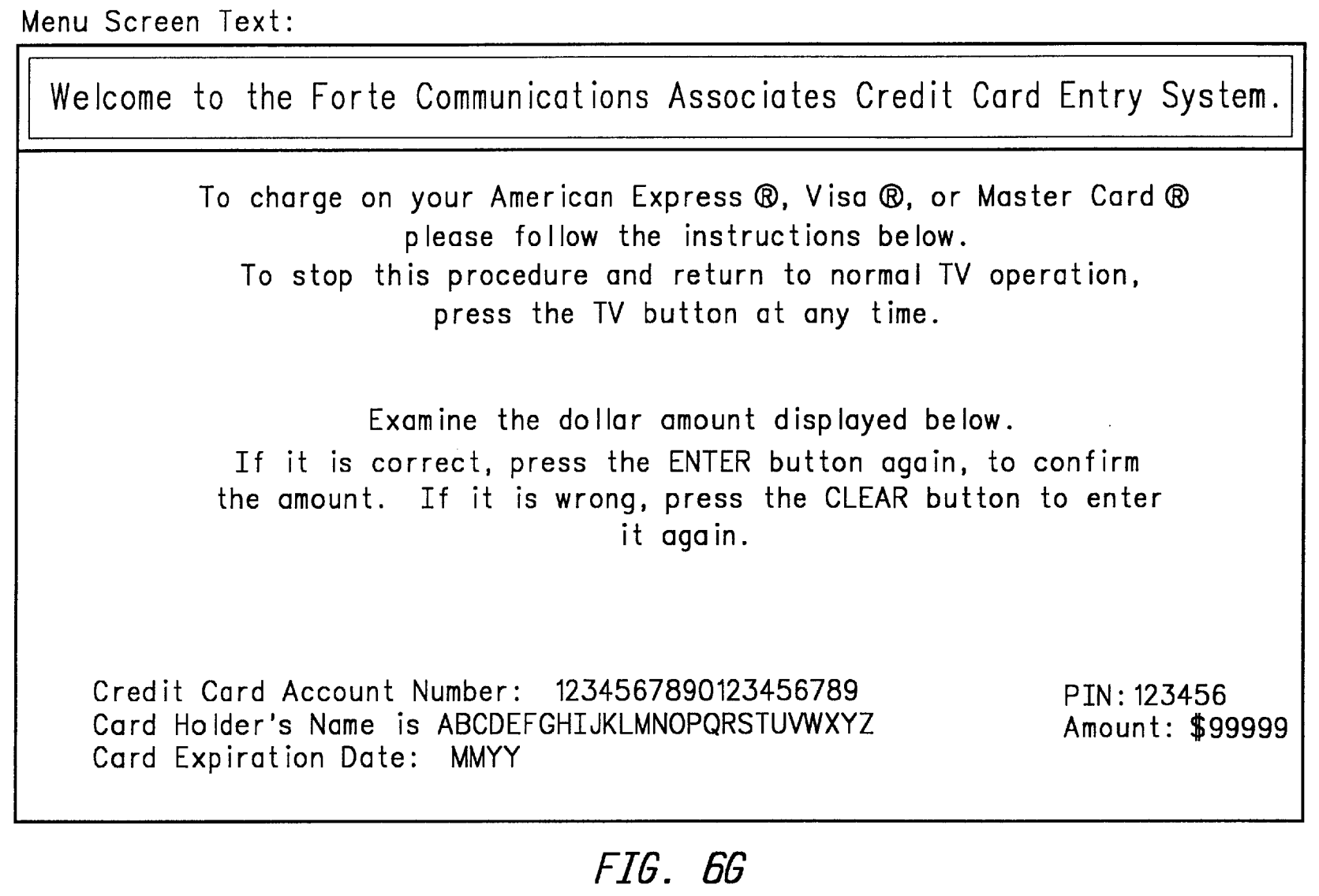

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press the TV button at any time.

Examine the dollar amount displayed below.
If it is correct, press the ENTER button again, to confirm
the amount. If it is wrong, press the CLEAR button to enter
it again.

Credit Card Account Number: 1234567890123456789
Card Holder's Name is ABCDEFGHIJKLMNOPQRSTUVWXYZ
Card Expiration Date: MMYY PIN: 123456
Amount: $99999

FIG. 6G

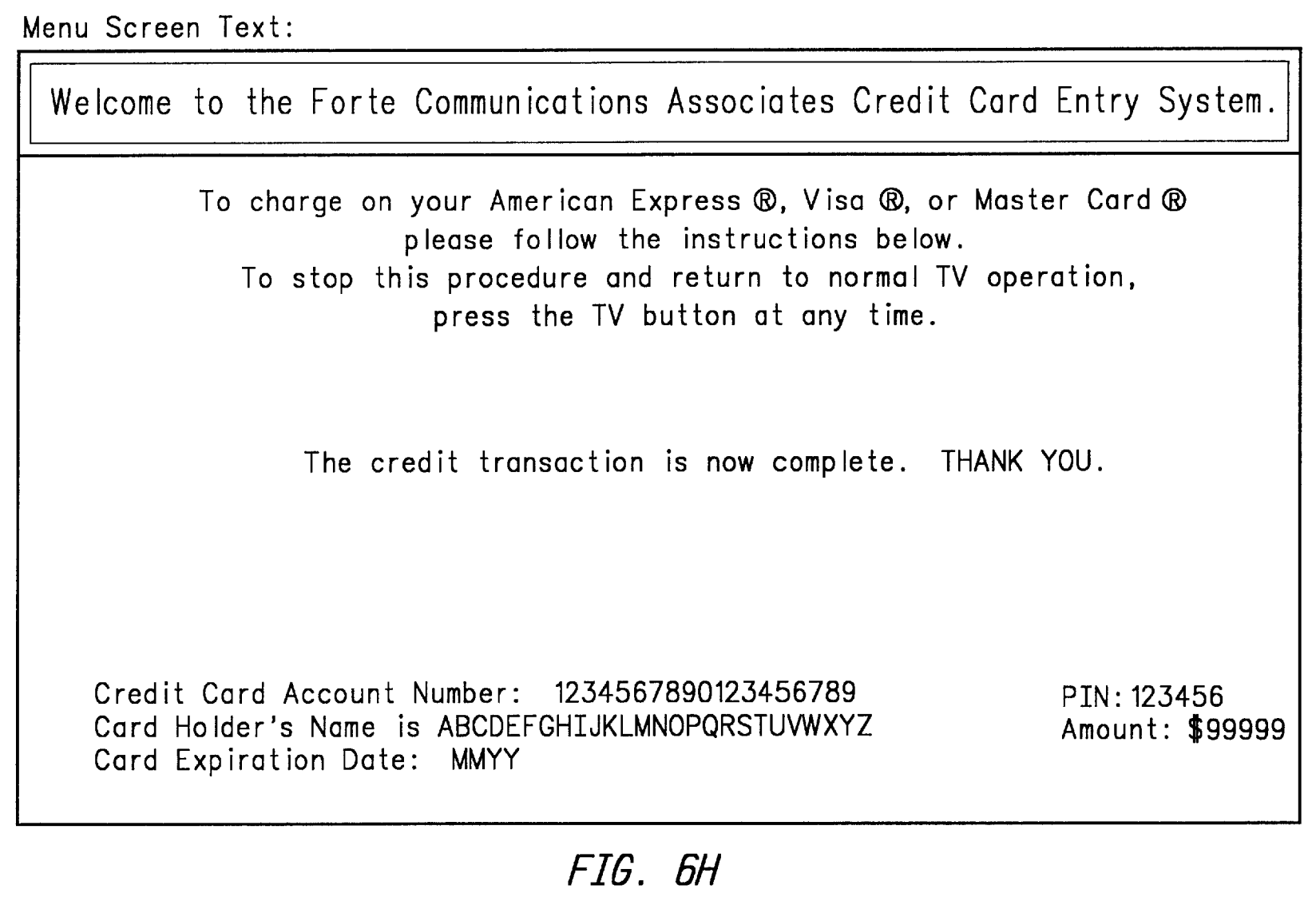

Menu Screen Text:

Welcome to the Forte Communications Associates Credit Card Entry System.

To charge on your American Express ®, Visa ®, or Master Card ®
please follow the instructions below.
To stop this procedure and return to normal TV operation,
press the TV button at any time.

The credit transaction is now complete. THANK YOU.

Credit Card Account Number: 1234567890123456789
Card Holder's Name is ABCDEFGHIJKLMNOPQRSTUVWXYZ
Card Expiration Date: MMYY PIN: 123456
Amount: $99999

FIG. 6H

IR TRANSMITTER WITH INTEGRAL MAGNETIC-STRIPE ATM TYPE CREDIT CARD READER AND METHOD THEREFOR

CROSS-REFERENCE TO RELATED APPLICATIONS

The present application is a con of Ser. No. 8/666,027, filed Jun. 19, 1996 U.S. Pat No. 5,973,756 which is a continuation-in-part of application Ser. No. 08/597,246 filed Feb. 6, 1996, now U.S. Pat. No. 5,870,155 and which is assigned to the same assignee as the present application.

BACKGROUND OF THE INVENTION

The present invention relates to an IR (infra-red) transmitter with integral magnetic-stripe card reader and method therefor and, in addition, a compatible IR receiver and display for use in an interactive environment, such as, for example, in a hotel room casino environment, with a cable TV home shopping network wherein a user communicates with the home shopping network from his or her home, an off track betting (OTB) environment, or any other financial transaction interactive environment having interactive communication capability, such as the world wide web.

Commercial reception to interactive environments is greatly increasing at the present time, particularly with respect to financial transaction interactive environments utilizing a magnetic stripe card such a credit card, ATM card, debit card, and other similar type cards. The magnetic stripe embedded on such a financial type of card contains credit line information from a financial institution for a particular user, together with other identifying information about the user.

As an example, in a cable TV home shopping network, a user must somehow provide credit information from a credit card so as to be able to purchase an item from the home shopping network. In another environment, a user who wishes to participate in off track betting (OTB) race track environment must generally have pre-established a credit limit in order to place wagers with the particular race track location.

It would therefore be very desirable to provide a more accurate and faster means and method of permitting a user to directly participate in the interactive environments such as described above.

SUMMARY OF THE INVENTION

It is an object of the present invention to provide an improved television remote control unit and method therefor for transmitting IR (infra-red) signals to a remote interactive location such as a television or a cable remote control box.

The present invention provides an IR (infra-red) transmitter with an integral magnetic-stripe credit card or ATM card reader, compatible IR receiver, for use in interactive environment, such as, for example, in a hotel room casino environment, a cable TV home shopping network, or OTB race track environment. The transmitter unit can be used to control TV functions, as well as transmit financial data read from the magnetic stripe of the card to a receiver that is equipped to receive the data. The unit can be used for interactive games, gambling, movies, or other such interactive events that require payment immediately.

In one preferred embodiment, the remote control unit includes an integral magnetic stripe card reader and a sensor which detects when a financial transaction type magnetic stripe card (e.g., a credit card) is swiped through the reader so as turn on the power of the unit. With the power on, the reader reads credit card information from the swiped credit card to form credit card information.

The remote control unit also includes a keypad such that a user can enter transaction information for a particular credit card transaction. The unit further includes a processor for processing the credit card information and the transaction information to form IR credit card transaction signals. The remote control unit also includes an IR transmitter for transmitting the IR credit card transaction signals to the remote interactive location.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 6A–6H are illustrative step by step examples of interactive financial transactions according to the present invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
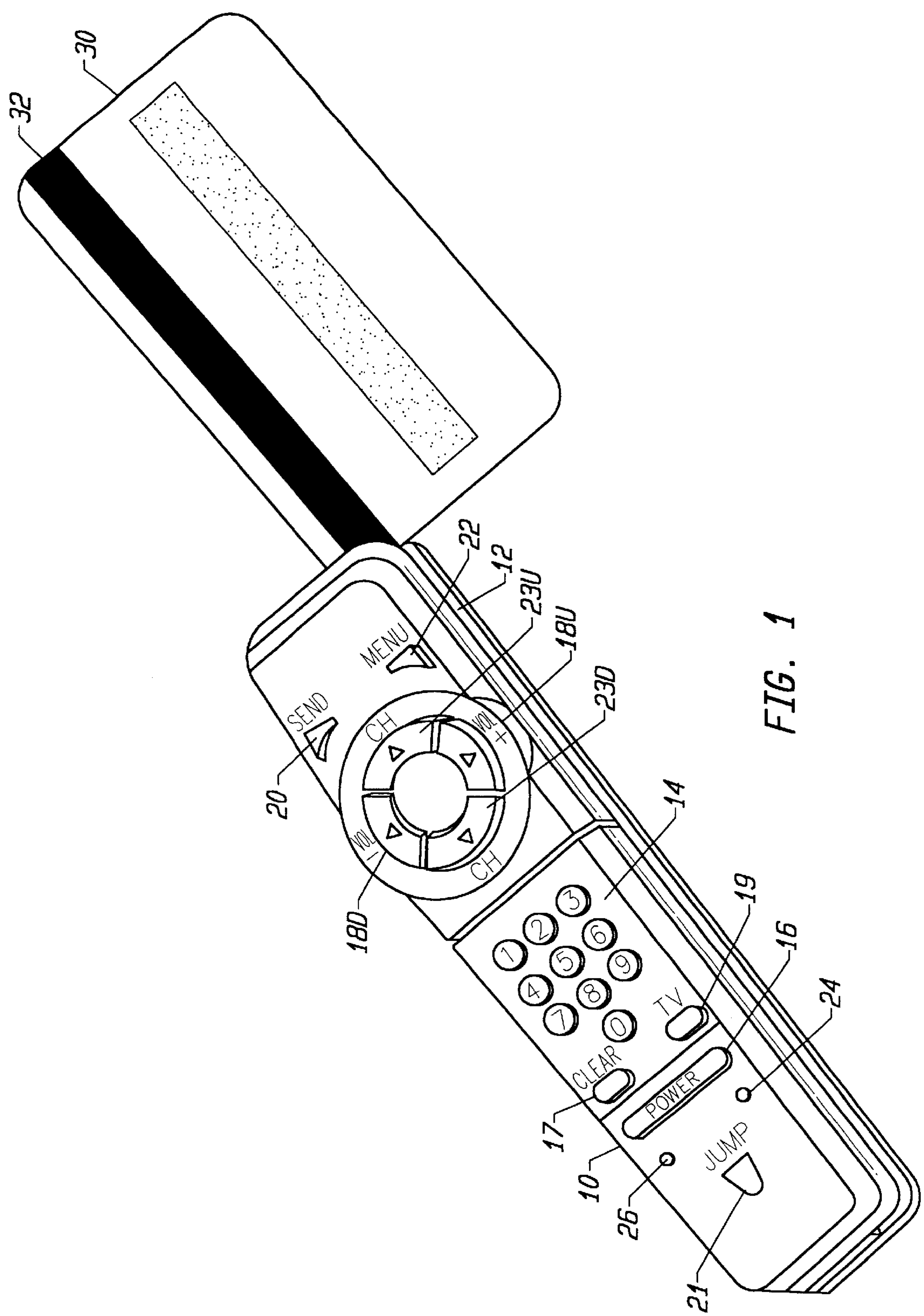
FIG. 1 is a perspective view of one embodiment of an IR transmitter with integral magnetic financial transaction card reader according to the present invention.

FIG. 1 shows a perspective view of one embodiment of the present invention. The unit 10 is a hand held device, approximately 2"×7" powered by two internal AA batteries (not shown). Typically, the user would be controlling the unit 10 from his or her home, hotel room or other suitable location.

The remote control unit 10 of FIG. 1 includes a slot 12 for a built-in financial transaction card reader so as to read card information, from for example, a credit card 30 which is swiped through the unit 10 by a user. The unit 10 includes keys 14 such that a user can enter transaction information for a particular transaction. A control power key 16 is provided to activate the unit 10, although the unit 10 can be activated by the swiping of credit card 30, as will be described later.

Figure 4:
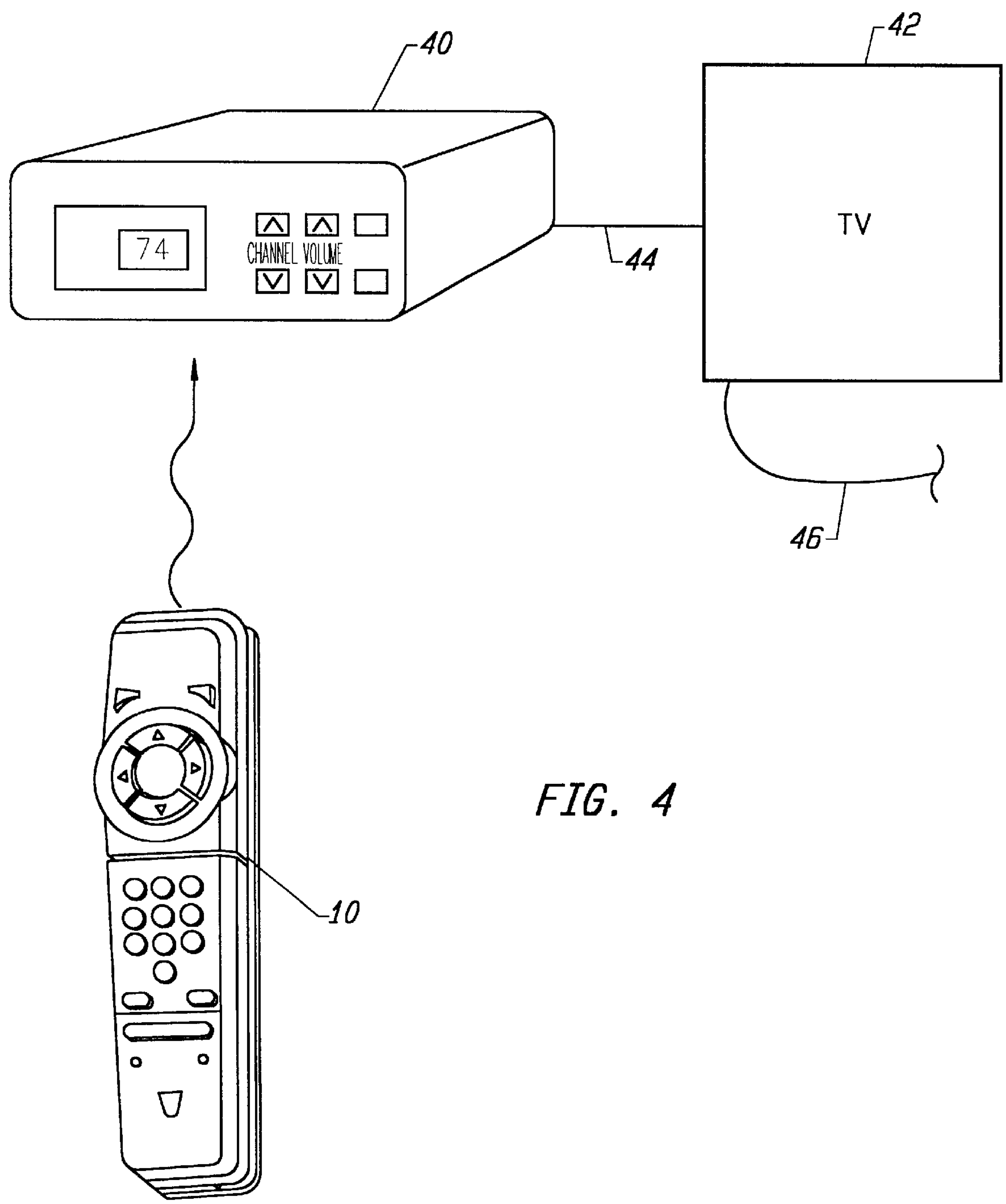
FIG. 4 is a view of a TV cable box used in conjunction with the credit card reader of FIG. 1.

Control SEND key 20 provides a send function for transmitting an IR signal to a remote television or preferably a cable set top box 40, as shown in FIG. 4. A MENU key 22 in FIG. 1 is provided for a menu function as known in the art. The MENU key 22 can transmit signals to a cable set top box 40 and provides the hand held control functions of unit 10 to the cable box 40, as will be described. The TV key 19 is for turning on a TV such that the remote unit 10 provides a dual function control of a TV set top box (TV remote control) as well as card swiping. The CLEAR key 17 provides a clearing function and the JUMP key 21 provides for a jumping function.

When SEND key 20 is depressed, the unit 10 sends infra-red (IR) signals to a television or cable set top box 40 (FIG. 4) that is equipped to receive the data. The channel keys 23U, 23D and volume keys 18U, 18D of FIG. 1 and the corresponding signals activate the controls of a television (e.g. channel up or down, volume up or down). Unit 10 is microprocessor controlled, with an ASCII look up table in ROM, as will be described.

Unit 10 has a slot 12 on the side where a magnetic striped card 30 embedded with information on stripe 32 can be "swiped", transferring the data which is stored on the magnetic stripe 32 the card 30 to a decoder chip, which then is stored in DRAM (memory). When the card 30 is inserted in the slot 12 on the side of unit 10, and passes a certain point, the action of the card 30 passing that certain point triggers an opto-electric device or switch that turns on the power of the unit 10.

By turning on the power, data that has been transferred from the magnetic stripe 32 of the card 30 is then decoded into ASCII codes that can be stored in the memory (FIG. 3) of the unit 10, until such time as the user depresses send button 20 on the unit 10 to transmit the data to a television or set top cable box 40 (FIG. 4). When the card 30 is swiped through the slot 12 on the side of unit 10, the user is alerted when the information of the magnetic stripe 32 is correctly received by a GREEN LED 24 being illuminated. If the GREEN LED 24 is not illuminated, and the RED LED 26 is illuminated, the user must pass the card through the slot 12 again. This procedure is repeated until the GREEN LED 24 is illuminated. Alternatively, this function could be accomplished by a television set display informing the user whether the card 30 was read correctly.

The television set or cable set top box 40 of FIG. 4 prompts the user to depress a certain key to transfer the information stored in the memory of the unit to the receiver of the television or cable set top box 40 of FIG. 4. The user also is prompted to manually insert PIN (personal identification number) numbers and the amount of the transaction in dollars by using the numeric pad 14 of the unit 10.

In one embodiment, the microprocessor of the hand held device 10 is programmed to "time out" or turn off the batteries of the hand held device 10 after a predetermined period (for example, three minutes). Unlike other magnetic stripe readers and decoders, the unit 10 requires no external power to operate, and functions as television or cable set top box controller as well.

Figure 2:
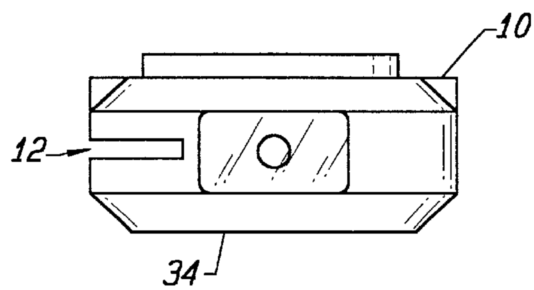
FIG. 2 is a top view of the device of FIG. 1.

FIG. 2 shows a top view of unit 10 with the slot 12 and IR transmitting device 34, the function of which will be described with respect to FIG. 3.

Figure 3:
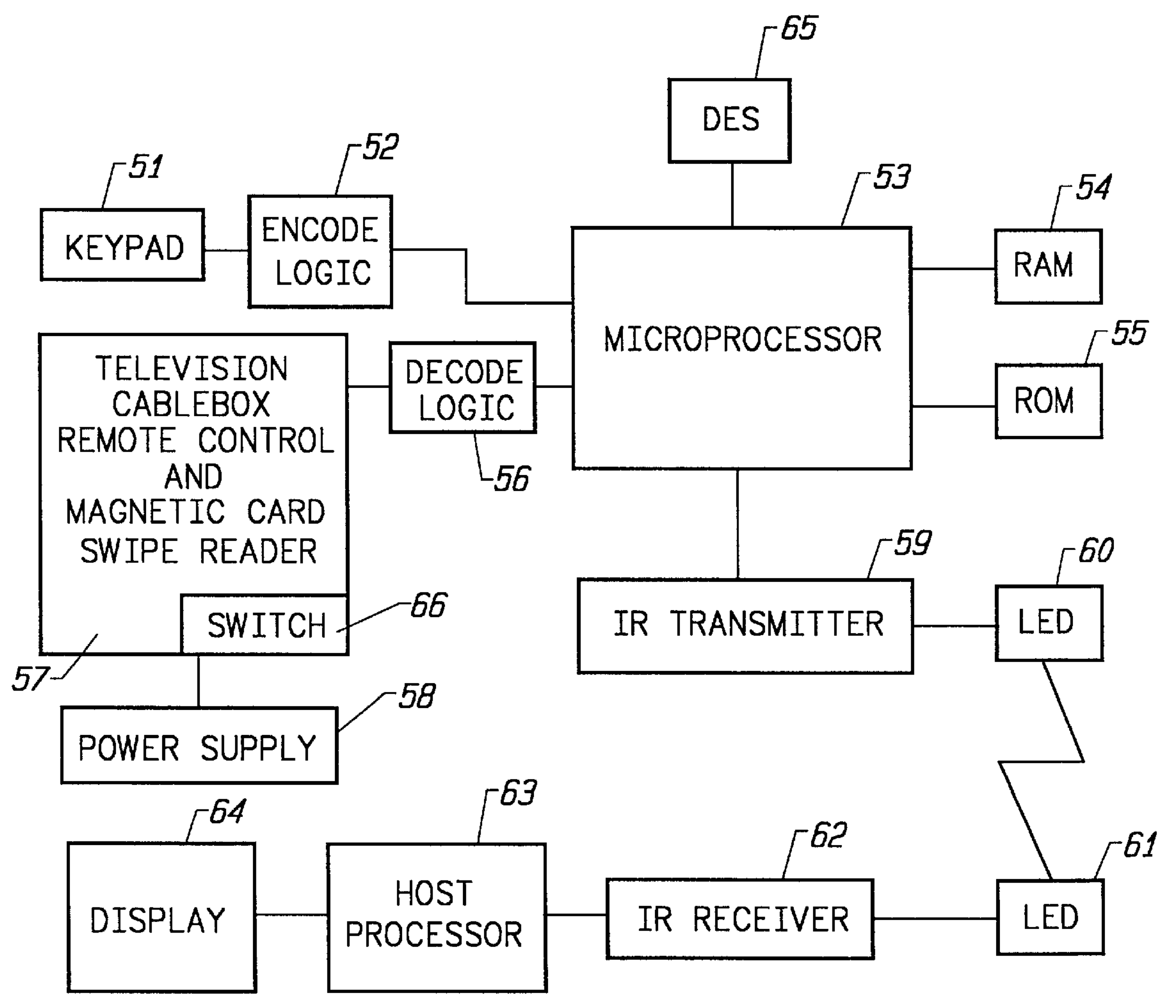
FIG. 3 is a block diagram of the present invention.

FIG. 3 shows a block diagram of one preferred embodiment of the present invention. In FIG. 3, the IR Transmitter Unit (51–60) is a hand-held, battery powered unit which collects the user's credit card information, personal identification number (PIN) and the amount of the transaction and transmits this information to the IR Receiver Unit (51–54) using infrared LED's.

The 16-key Keypad (51) contains keys for entering digits: 0–9, and for selecting functions such as TV, MENU, ENTER, and CLEAR. The Keypad (51) interfaces to the Encode Logic Module (52), which autonomously scans the Keypad, detects key presses, debounces and decodes the input from the Keypad (51). The Encode Logic Module (52) then signals the Microprocessor (53) that input is available. The Encode Logic Module (52) holds this input until the Microprocessor (53) reads the input and resets the Encode Logic Module (52).

The Magnetic Card Swipe Reader (57) uses a sensor or switch 66 to detect that a card is being swiped and this in turn is used to signal the Power Supply (58).

Whenever a card is swiped, the information on the magnetic strips is read, decoded and error checked. The Swipe Reader (57) sends information to the Decode Logic Module (56) which converts the serial bit stream from the reader into a byte-wide stream for input to the Microprocessor (53). The Decode Logic Module (56) signals the Microprocessor (53) that data is available via both status and interrupt signals.

The Microprocessor (53) stores the information received from the Encode Logic Module (52) and the Decode Logic Module (56) in RAM (54) for further processing. The software to control the operation of the Microprocessor (53) is stored in the ROM (55). The Microprocessor (53) formats the data and sends the data to the IR Transmitter (59).

The information collected by the Microprocessor (53) is formed into packets and transmitted to the IR Receiver Unit 61–64 via a modulated infra-red light beam by the IR Transmitter (59) using a LED (60), which transmits to LED (61) to IR Receiver (62), Host Processor (63), and Display (64).

In some instances, the remote unit 10 could utilize a DES encryption clip 65 for encryption of an IR signal when using an ATM type of financial transaction card.

FIG. 4 shows a typical application of the present invention in which a remote unit 10 can be used in conjunction with an interactive network 50, including a remote cable set top box 40 which is connected by cable 44 to a suitable TV 42, which in turn is connected to an outside cable environment by cable 46. It can be seen that in FIG. 4 a remote control unit 10 according to the present invention could be utilized to interactively communicate with remote control box 40 (as shown) and/or TV 42.

Figure 5:
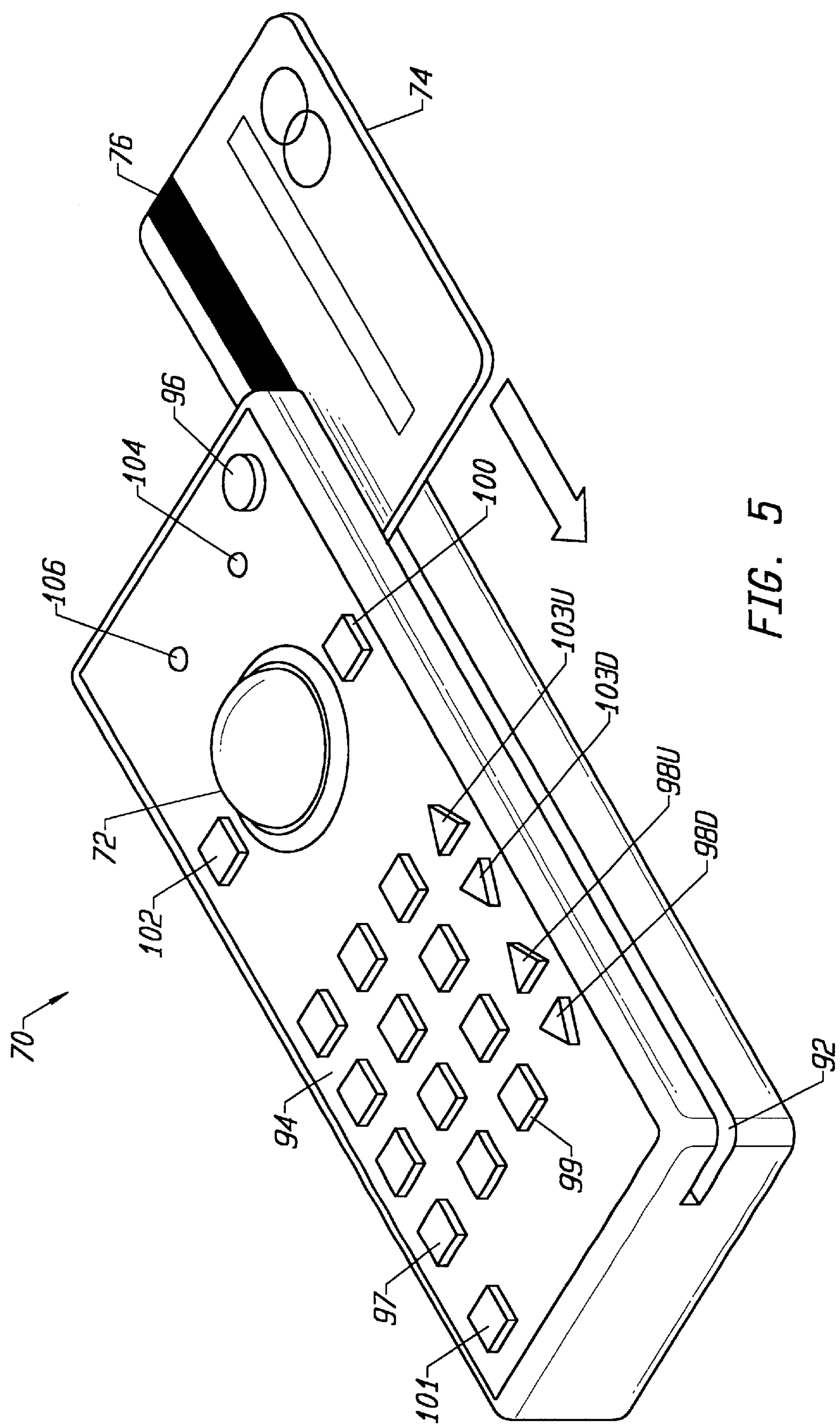
FIG. 5 is an alternative embodiment of a credit card reader utilizing a trackball control configuration.

FIG. 5 shows an alternative embodiment 70 of the present invention in which the control function is in the form of a trackball configuration 72.

The alternative embodiment depicted in FIG. 5 includes a POWER key 96 for turning on the power of the television. The control unit 70 in FIG. 5 includes a trackball control element 72 together with the corresponding control keys as in FIG. 1, including the GREEN/RED LED's 104, 106, MENU key 102, ENTER (SEND) key 100, CHANNEL Up/Down keys 103U, 103D, VOLUME Up/Down keys 98U, 98D, TV key 99, CLEAR key 97; and JUMP key 101. In operation in FIG. 5, a credit card 74 with a magnetic stripe 76 would be swiped through slot 92 in a fashion analogous to that of the preferred embodiment of FIGS. 1–4 described herein.

In order to more clearly describe the features of the present invention, a detailed illustrative example of a financial interactive transaction will be described in conjunction with FIGS. 6A–6H. For purposes of the illustrative example, assume that the description of FIGS. 6A–6H are in conjunction with the preferred embodiment shown in FIGS. 1–4, together with a suitable display on a television set interactively and remotely connected to the unit 10 of the present invention. Assume further for purposes of the illustrative example, that the system is in connection with an entity known as Forte Communications Associates Credit Card Entry System and that the user will be utilizing a suitable credit card, such as American Express, VISA or MasterCard.

In FIG. 6, the TV monitor screen text illustrates to a user that the menu key 22 on the remote control unit 10 of FIG. 1 should be pressed. It should be kept in mind that the remote control unit 10 of FIG. 1 alternatively can control normal TV operation by the user pressing the TV button at any time.

Assuming that the user has pressed menu key 22, FIG. 6B illustrates that the user should be prompted to swipe the card 30 of FIG. 1 through the slot 12 (slot 12 is better seen in FIG. 2). If the card is swiped through the slot 12 on the side of the remote control unit 10 of FIG. 1, a green light indicates a successful read, as indicated in FIG. 6B. If a red light is indicated, the user is prompted that the card 30 could not be read and is prompted to try again. The user points the TV remote control unit 10 at the TV and presses the ENTER button to send the information.

In FIG. 6C, the display prompts the user to examine the credit card information (displayed in the lower left hand comer of FIG. 6C) which indicates the credit card account number, the holder name and the expiration date of the particular user, which information had been obtained by the swiping of the card 30 through the unit 10 of FIG. 1.

If the displayed information is correct, the user presses the ENTER button to confirm the information, and if not correct, presses the CLEAR button to enter the information again.

FIG. 6D illustrates the system prompting the user to enter a personal identification number (PIN)—up to six digits in one preferred embodiment—using the keys 14, as illustrated in FIG. 1. The user points the TV remote control unit 10 at the TV and presses the ENTER button to send the information.

FIG. 6E illustrates the PIN number information (displayed in the lower right hand corner). If correct, the user presses the ENTER button again to confirm the number. If incorrect, the user presses the CLEAR button to enter the PIN information again.

FIG. 6F illustrates that the system prompts the user to enter the dollar amount of the service, using the remote control unit number pad 14 of FIG. 1. The user points the TV remote control unit 10 at the TV and presses the ENTER button to send the information.

FIG. 6G illustrates the amount of the financial transaction (lower right hand corner). If the correct amount is indicated, the user presses the ENTER button to confirm the amount. If incorrect, the user presses the CLEAR button to enter the transactional information again.

FIG. 6H indicates the completed transaction showing the credit card account information, credit card holder information, credit card expiration date, PIN number, and amount transaction number as being transmitted to, for example, a home shopping network.

It should be clear that other variations of the preferred embodiment of the invention are within the scope of the claims of the present invention.

For example, the interactive and transactional environment can be in addition to a home shopping network, a hotel casino environment, off track betting system, interactive games, movies and any other type of interactive financial event that requires financial credit card type information.

The present invention provides a remote control television unit which is hand held and requires no cord connection to an interactive location (such as a TV or cable control box), as well as control of the TV/control box (a dual purpose control unit). In one embodiment, the remote control unit is battery operated so that a user could easily enter the required financial transaction, information remotely to the interactive environment.

The present invention is for uses where a user wishes to pay for goods or services with at financial transaction type card, such as credit card or an ATM card.

In a gambling environment, if a user wishes to be authorized to obtain casino cash, the user brings up the MENU on the screen by pressing the appropriate button and follows the instructions on the screen, which would be analogous to that of FIGS. 6A–6H. If the transaction is valid (the card is good) the user can then go to the casino cashier to pick up the cash.

Figure 7:
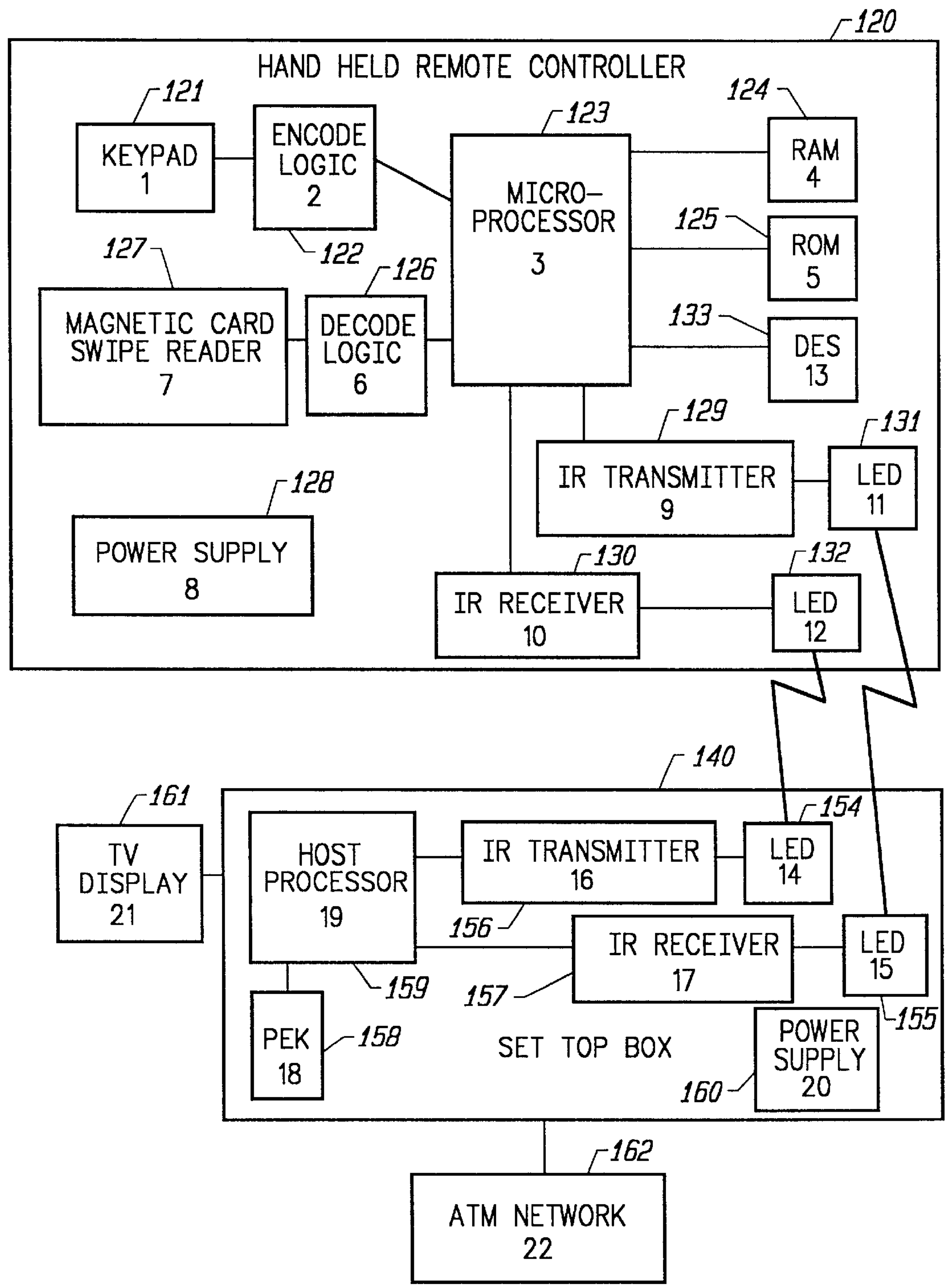
FIG. 7 is a block diagram showing an ATM type of financial transaction interactive environment according to another embodiment of the present invention.
Figure 8:
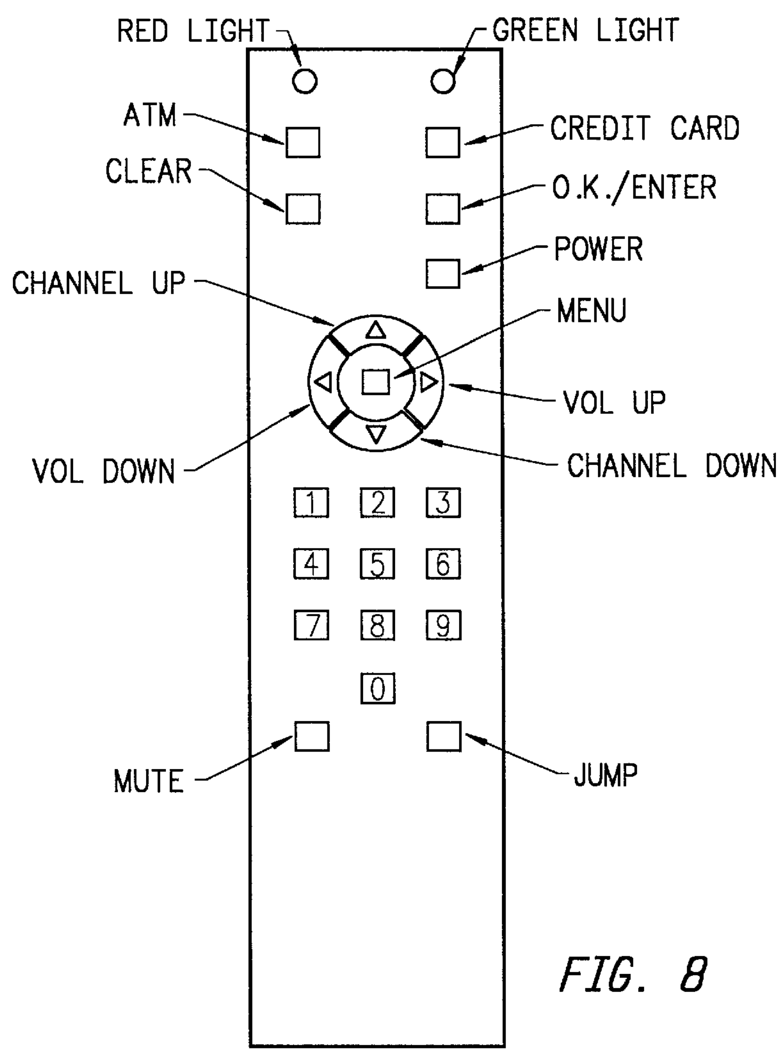
FIG. 8 is a front view of an ATM type of remote controller according to the present invention.

Referring now to FIGS. 7 and 8, another embodiment of the present invention will now be described in conjunction with an ATM evvironment wherein a user will be involved with a financial transaction using his or her ATM type card.

FIG. 7 shows a block diagram of Remote Controller 120 for use with an ATM type of financial type of transaction according to the present invention and FIG. 8 shows a front view of an ATM type of Remote Controller according to the present invention. The remote controller 120 of FIG. 8 is analogous to the units shown in FIGS. 1 and 5, but in addition provides an ATM type of transactional interactive capability as will be described.

The remote control unit 120 of FIG. 8 includes similar control keys as for FIGS. 1 and 5, including CHANNEL UP/CHANNEL DOWN; VOLUME UP/VOLUME DOWN; JUMP; MUTE; CLEAR; ENTER(OK); RED/GREEN LED's; KEYPAD; POWER; and MENU keys. In addition, remote control unit 120 includes an integral credit card reader (not shown) analogous to the units shown in FIGS. 1 and 5. Also, the remote control unit 120 of FIG. 8 includes an ATM key for initiating ATM type of financial card transaction, as will be described in conjunction with FIG. 7, and a CREDIT CARD key for for initiating a credit card type of transaction as previously described.

In a typical ATM type of transaction, a user depresses the ATM key of FIG. 8, which will turn on the power of the remote control unit 120 of FIG. 7. The IR Transmitter 129 sends a signal to the Set Top box 140, which in response sends the PEK signal to the remote control unit 120.

The user swipes the ATM card through the reader 127, and either the Green LED or Red LED of FIG. 8 will be illuminated. If the Green LED lights, the user depresses selected ones of the KEYPAD keys to enter his or her PIN information. If the Red LED lights, the User repeats the ATM card swipe until the Green LED lights.

The user will then follow the instructions displayed on the television menu displayed on TV Display 161, including requesting the ATM instructions from a checking account, savings account, or the like from the particular financial institution which is authorizing and verifying the particular transaction. The user depresses the appropriate keys shown in FIG. 8, including the KEYPAD keys for entering the appropriate financial information.

The user then depresses the ENTER or OK key to complete the transaction or depresses the CLEAR key to re-initiate the transaction. Processor 123 will power off the remote control unit 120 after the transaction is completed ( typically within 2–5 minutes). Depressing the ENTER key could also initiate turning off the power to the remote control unit 120. The user waits for the ATMN acceptance on the TV display 161.

In FIG. 7, the hand held Remote Controller (IR Transmitter/Receiver) 120, including components KEYPAD121; ENCODE LOGIC 122; MICROPROCESSOR 123; RAM 124; ROM 125; DECODE LOGIC 126; MAGNETIC CARD SWIPE READER 127; POWER SUPPLY 128; IR TRANSMITTER 129; IR RECEIVER 130; LED 131; LED 132; AND DES 133 (which correspond to similar components shown in FIG. 3) including integral magnetic-stripe ATM credit card reader unit 127, is battery powered and can act as a TV remote control as well as read the user's ATM card information, coded personal identification number (PIN) and the amount of the transaction and transmits this information to Set Top Box 140, which includes components LED 154; LED 155; IR TRANSMITTER 156; IR RECEIVER 157; PEK (Personal Encryption Key) 158; HOST PROCESSOR 159; and POWER SUPPLY 160, using infra-red (IR) LED's 154, 155. Set Top Box 140 transmits a Personal Encryption Key (PEK) that is used to code the user's PIN and provides a menu for the user as a television display. The remote control unit 120 of FIG. 7 includes the IR RECEIVER 130 and LED 132 for receiving signals from the Set Top Box 140. Typically, Set Top Box is a stand alone unit (i.e., a "decoder") setting on top of a television. Alternatively, the functional aspects of the Set Top Box 140 could be incorporated within a television set itself, as would be apparent to one of ordinary skill in the art.

The Keypad 121 contains keys for entering the digits 0–9, and includes keys (shown in FIG. 8) for selecting functions such as TV, MENU, ENTER, CLEAR and ATM. The Keypad 121 interfaces to the Encode Logic Module 122, which autonomously scans the Keypad 121, detects key presses, debounces and decodes the input from the Keypad 121. The Encode Logic Module 122 then signals the Microprocessor 123 that input is available. The Encode Logic Module 122 holds this input until the Microprocessor 123 reads the input and resets the Encode Logic Module 122.

When the user depresses the Menu Key (FIG. 8) on the Remote Controller 120, various menus will be displayed on the TV 161. When the ATM key (FIG. 8) is depressed, the Set Top Box 140 displays a menu on a TV 161 and sends a PEK 158 to the Remote Controller 120 via IR Transmitter 156 and LED 154. The PEK 158 can be updated at any time by the ATM Network 162. The menu will request the user to swipe his or her ATM card (FIG. 8) Whenever a card is swiped, the information on the magnetic stripe is read, decoded and error checked by the Remote Controller 120. At this time a Red or Green LED (FIG. 8) on the Remote Controller 120 is lighted. A Red light indicates that the Remote Controller 120 could not read the stripe. A Green light indicates that the card was read correctly. The Swipe Reader 127 sends information to the Decode Logic Module 126 which converts the serial bit stream from the reader 127 into a byte-wide stream for input to the Microprocessor 123 that data is available via both status and interrupt signals.

The Microprocessor 123 stores the information received from the Encode Logic Module 122 and the Decode Logic Module 126 in RAM 124 for farther processing. The software to control the operation of the Microprocessor 123 is stored in the ROM 125. The Microprocessor 123 uses the PEK 158 sent to it by the Set Top Box 140 to code the PIN and send the coded PIN with the other information contained on the ATM card (FIG. 8) to the Set Top Box 140 via the IR Transmitter 129 and LED 131.

The Set Top Box 140 sends the user's ATM card information to an ATM Network 162 for verification and authorization. Based on the response received from the ATM Network 162, the Set Top Box 140 then displays the appropriate menu on the TV Display 161. The Remote Controller 120 is then used to select an account, input an amount, and authorize the transaction following the directions displayed on the TV menu. After the transaction is complete the stored information in RAM 124 and the PEK are erased for security purposes, as it is not desirable to permanently store any such ATM type transaction information, including the PIN and PEK codes, within the remote control unit after the transaction is completed (in order to minimize the risk of unauthorized accesss to the PIN/PEK information).

Figure 9:
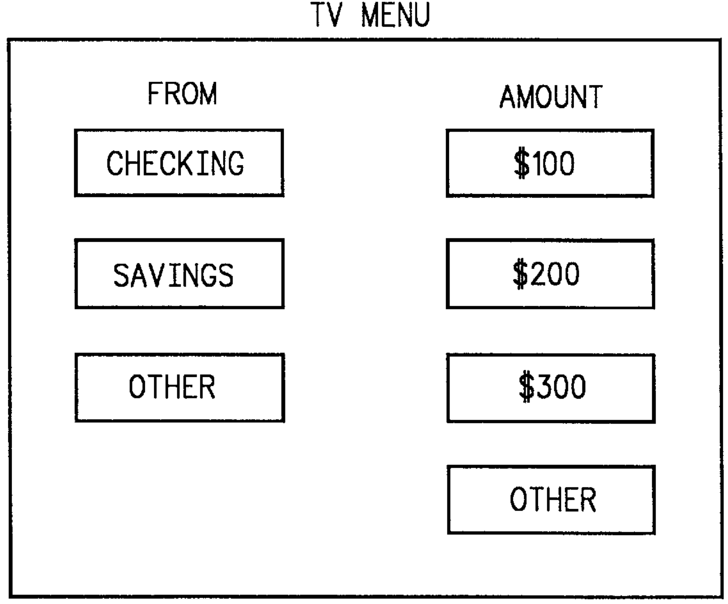
FIG. 9 is a block diagram of a television menu display for an ATM type of transaction according to the present invention.

FIG. 9 shows a block diagram of a menu display on the TV display 161 of FIG. 7. The TV menu display of FIG. 9 could be for an ATM type of transaction for placing a bet (e.g., "Casino Cash") in a hotel room casino environment. The user selects from the desired account on menu display, such as the CHECKING account or SAVINGS account by using the cursor control keys (i.e., CHANNEL UP/CHANNEL DOWN and/or VOLUME UP/VOLUME DOWN keys) on the remote control unit of FIG. 8 to highlight the CHECKING or SAVINGS display and depressing the ENTER key to select the particular highlighted account. The user then uses the control keys to highlight the desired amount, i.e. the $110; $200; $300; or OTHER amounts, then depresses the ENTER key for selecting the desired amount.

Figure 10:
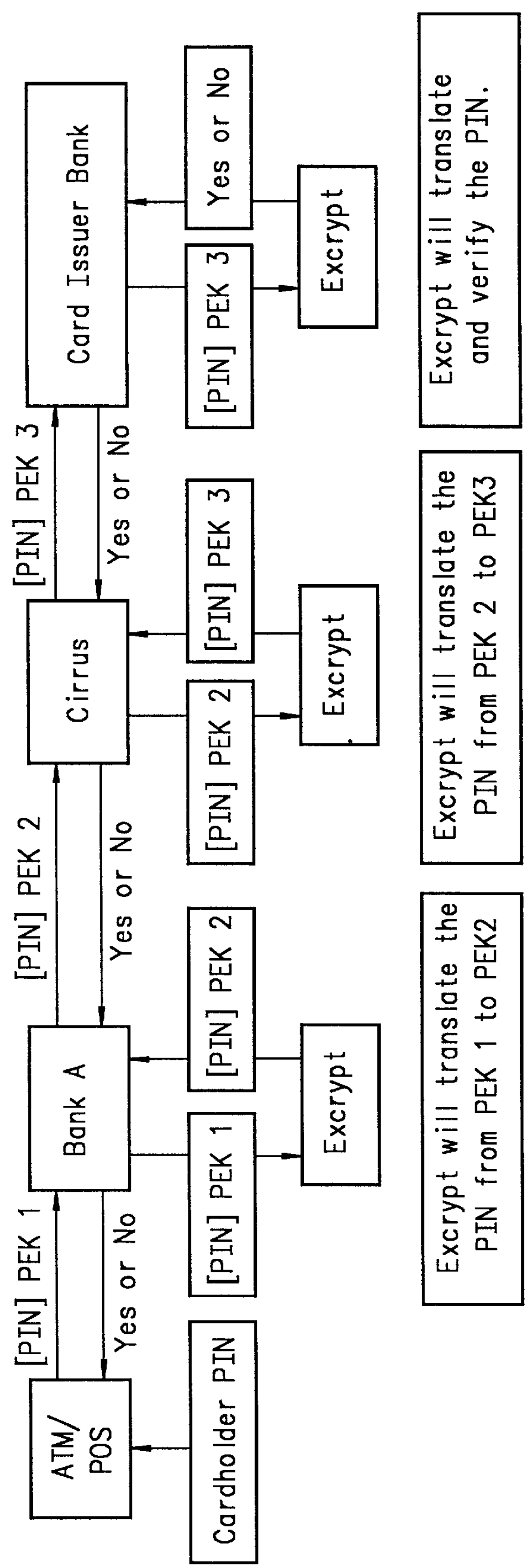
FIG. 10 shows an example of an encryption algorithm when utilized with the present invention.

FIG. 10 shows a block diagram of an encryption algorithm for utilizing an ATM type transaction according to the present invention. As is known in the art, PIN information must be encrypted from the time a user (cardholder) enters the PIN number at an ATM or POS (Point Of Sale) terminal until the transaction is approved or denied by the ATM card issuer.

Typically, the Data Encryption Standard (DES) is the type of encryption algorithm used in the ATM transaction process. A Key Part is a 16-digit hexadecimal character (0–9 and A–F) which makes the DES algorithm secure. Three Key Parts are most commonly used in the DES algorithm, but up to nine Key Parts can be used for added security. An example of a single Key Part is (1a88df42 7bd8 9e63).

The major types of keys are Master Key File (MFK). The MFK key encrypts all other keys that belong to a particular institution and those keys reside on the particular institution' computer system. The PIN Encryption Key (PEK) encrypts the actual PIN number, and the Key Exchange Key (KEK) encrypts the PEK when it is being changed between two processors (e.g., Bank A and Cirrus as shown in FIG. 10). The PIN Generation Key (PGK) is used to generate the PIN at the time of issue. The PIN Verification Key (PVG) is used to verify the PIN during a cardholder transaction request. As shown in FIG. 10, the two main encryption functions are PIN translations and PIN verifications.

The foregoing descriptions of specific embodiments of the present invention have been presented for purposes of illustration and description. They are not intended to be exhaustive or to limit the invention to the precise forms disclosed, and it should be clear that many modifications and variations are possible in light of the above teaching. For example, the preferred embodiment utilizes a credit card type of financial transaction card. However, other types of financial transaction cards could be utilized as well, such as an ATM card, a debit card, Smart-card and the like. Also, the present invention could be utilized in the interactive environments described above, as well as other interactive environments, including the world wide web. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A television remote control unit for transmitting IR (infra-red) signals to an interactive location such as a television set top box, said remote control unit comprising:

an integral magnetic stripe financial ATM transaction type card reader for reading ATM type financial card information from a magnetic stripe of an ATM type card swiped through said reader to form read ATM card information;

a keypad for entering ATM transaction information for a particular ATM card transaction and for entering ATM card identification information relating to a specific personal identification number (PIN) to form PIN information;

receiver means for receiving a personal encryption key (PEK) from said interactive location to code said PIN information thereby forming coded PIN information;

a processor for processing said ATM transaction information and said coded PIN information to form IR ATM card transaction signals; and an IR transmitter means for transmitting said IR ATM card transaction signals to said interactive location.

2. A remote control unit as in claim 1 including an IR transmitter for transmitting ATM transaction indication or PIN information to said interactive location, said interactive location responsive to said ATM transaction information or said PIN information for transmitting said PEK to said receiver means.

3. In a financial transaction card interactive network including a television remote control unit for transmitting IR (infra-red) signals to an interactive location such as a television set top box, said remote control unit including an integral magnetic-stripe financial ATM transaction type card reader, the method comprising the steps of:

reading ATM type financial card information from a magnetic stripe of an ATM type card swiped through said remote control unit to form read ATM card information;

entering into said remote control unit ATM transaction information for a particular ATM card transaction, entering into said remote control unit ATM card identification information relating to a specific personal identification number (PIN) to form PIN information;

receiving into said remote control unit a personal encryption key (PEK) from said interactive location to code said PIN information thereby forming coded PIN information;

processing within said remote control unit said ATM transaction information and said coded PIN information to form IR ATM card transaction signals; and transmitting said IR ATM card transaction signals from said remote control unit to said interactive location.

4. In a financial transaction card interactive network comprising:

an interactive location such as a television set top box, an ATM network, a television display, a television remote control unit for transmitting IR (infra-red) signals to said interactive location, said remote control unit including an integral magnetic stripe financial ATM transaction type card reader for reading ATM type financial card information from a magnetic stripe of an ATM type card swiped through said reader to form read ATM card information;

keypad means for entering ATM transaction information for a particular ATM card transaction and for entering ATM card identification information relating to a specific personal identification number (PIN) to form PIN information;

receiver means for receiving a personal encryption key (PEK) from said interactive location to code said PIN information thereby forming coded PIN information;

processor means for processing said ATM transaction information and said coded PIN information to form IR ATM card transaction signals; and IR transmitter means for transmitting said IR ATM card transaction signals to said interactive location.

5. The network as in claim 4 wherein said remote control unit includes a Menu key for controlling the display of interactive menus on said television display through said interactive location.

6. The network as in claim 5 wherein said remote control unit includes an ATM key for entering an ATM financial transaction signal for transmission to said interactive location, said interactive location responsive to said ATM signal for transmitting said PEK to said remote control unit.

7. The network as in claim 6 wherein said interactive location includes transmitter means for transmitting said ATM card information to said ATM network for verification and authorization, said interactive location responsive to said verification and authorization for displaying a selected menu and transaction directions on said television display.

8. The network as in claim 7 wherein said remote control unit includes means for completing the ATM card transaction following said directions displayed on said selected menu on said television display.

* * * * *